(12) United States Patent
Li

(10) Patent No.: US 10,812,333 B2
(45) Date of Patent: Oct. 20, 2020

(54) MICROSERVICE CONFIGURATION APPARATUS AND METHOD

(71) Applicant: HUAWEI TECHNOLOGIES CO., LTD., Shenzhen, Guangdong (CN)

(72) Inventor: Linfeng Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 16/358,266

(22) Filed: Mar. 19, 2019

(65) Prior Publication Data
US 2019/0215239 A1    Jul. 11, 2019

Related U.S. Application Data

(63) Continuation of application No. PCT/CN2017/091273, filed on Jun. 30, 2017.

(30) Foreign Application Priority Data

Sep. 19, 2016   (CN) .......................... 2016 1 0832294

(51) Int. Cl.
*H04L 12/24* (2006.01)
*H04L 29/08* (2006.01)
(Continued)

(52) U.S. Cl.
CPC ............ *H04L 41/0823* (2013.01); *G06F 8/71* (2013.01); *G06F 9/46* (2013.01); *G06Q 10/0639* (2013.01);
(Continued)

(58) Field of Classification Search
CPC ............. H04L 41/5009; H04L 41/0823; H04L 41/0886; H04L 67/32; H04L 41/5012;
(Continued)

(56) References Cited

U.S. PATENT DOCUMENTS

2008/0263401 A1* 10/2008 Stenzel ............... H04L 41/5012
714/31
2016/0112475 A1    4/2016 Lawson et al.
(Continued)

FOREIGN PATENT DOCUMENTS

CN         102508771 A      6/2012
CN         103064820 A      4/2013
(Continued)

OTHER PUBLICATIONS

Office Action issued in Chinese Application No. 201610832294.3 dated Aug. 5, 2019, 7 pages.
(Continued)

*Primary Examiner* — Philip J Chea
*Assistant Examiner* — Mohammed Ahmed
(74) *Attorney, Agent, or Firm* — Fish & Richardson P.C.

(57) ABSTRACT

The present disclosure relates to microservice configuration apparatus and methods. One example method includes obtaining, by a management device, each indicator of a microservice of a service, where types of all indicators of microservices of different services are the same, calculating a health degree score of the microservice of the service based on each indicator of the microservice of the service, indicator weight information, and a health degree model, where health degree models corresponding to microservices of different services are the same, determining a configuration parameter for the microservice of the service based on the health degree score when the health degree score of the microservice of the service is less than a preset score threshold, and configuring the microservice of the service based on the configuration parameter.

13 Claims, 4 Drawing Sheets

(51) Int. Cl.
  *G06F 9/46* (2006.01)
  *G06Q 10/06* (2012.01)
  *G06F 8/71* (2018.01)
(52) U.S. Cl.
  CPC ...... *H04L 41/0886* (2013.01); *H04L 41/5009* (2013.01); *H04L 67/32* (2013.01)
(58) Field of Classification Search
  CPC ......... G06Q 10/0639; G06F 9/46; G06F 8/71; G06F 11/3495
  See application file for complete search history.

(56) References Cited

U.S. PATENT DOCUMENTS

| | | | |
|---|---|---|---|
| 2016/0205519 A1* | 7/2016 | Patel | H04L 67/1002 455/518 |
| 2017/0160880 A1* | 6/2017 | Jose | G06F 8/34 |
| 2018/0039555 A1* | 2/2018 | Salunke | G06F 11/3034 |
| 2019/0215239 A1* | 7/2019 | Li | H04L 41/5009 |
| 2019/0373007 A1* | 12/2019 | Salunke | H04L 41/0654 |

FOREIGN PATENT DOCUMENTS

| | | |
|---|---|---|
| CN | 105162884 A | 12/2015 |
| CN | 105550130 A | 5/2016 |

OTHER PUBLICATIONS

Extended European Search Report issued in Application No. 17850075.7, dated May 29, 2019, 9 pages.

PCT International Search Report and Written Opinion issued in International Application No. PCT/CN2017/091273 dated Sep. 20, 2017, 15 pages (with English translation).

* cited by examiner

US 10,812,333 B2

MICROSERVICE CONFIGURATION APPARATUS AND METHOD

CROSS-REFERENCE TO RELATED APPLICATIONS

This application is a continuation of International Application No. PCT/CN2017/091273, filed on Jun. 30, 2017, which claims priority to Chinese Patent Application No. 201610832294.3, filed on Sep. 19, 2016. The disclosures of the aforementioned applications are hereby incorporated by reference in their entireties.

TECHNICAL FIELD

The present disclosure relates to the field of microservice management technologies, and in particular, to a microservice configuration apparatus and method.

BACKGROUND

A microservice is an emerging software architecture style. Each microservice is a small functional block focusing on single responsibility and a single function. Several microservices constitute a complex large-scale application program. Microservice configuration is a key to provide a stable service by the large-scale application program for a user.

In the prior art, the microservice configuration is mainly completed online manually. Specifically, an operation and maintenance engineer views, by using an operation and maintenance system, an indicator that is in indicators of a microservice in a service system cluster and that greatly affects service performance of the microservice, and determines, by using operation and maintenance experience of the operation and maintenance engineer based on the indicator that greatly affects the service performance of the microservice, whether a service configuration operation needs to be performed on the microservice to improve service running quality. If the operation and maintenance engineer determines that service configuration needs to be performed, the operation and maintenance engineer selects a configuration parameter based on personal experience and information such as the indicator and a log of the microservice, and performs the configuration operation online by using a service configuration interface, to dynamically modify a configuration parameter of each node in the system cluster, and put the configuration parameter into effect in real time.

In a process of implementing the present disclosure, the inventor finds that the prior art has the following problems:

A service system usually includes a large quantity of microservices. In the prior art, an operation and maintenance engineer needs to identify an indicator that greatly affects service performance of each microservice, and determine and select a configuration parameter based on the identified indicator. Consequently, manual configuration efficiency is relatively low and parameter configuration accuracy is not high.

SUMMARY

This application provides a microservice configuration apparatus and method, to resolve prior-art problems that manual configuration efficiency is relatively low and parameter configuration accuracy is not high because an operation and maintenance engineer needs to identify an indicator that greatly affects service performance of each microservice, and determine and select a configuration parameter based on the identified indicator.

According to a first aspect, the present disclosure provides a microservice configuration method, including:

obtaining, by a management device, each indicator of a microservice of a service, where types of all indicators of microservices of different services are the same; calculating, by the management device, a health degree score of the microservice of the service based on each indicator of the microservice of the service and indicator weight information and a health degree model that are corresponding to the microservice of the service, where the indicator weight information indicates a weight of each indicator of the microservice of the service in the health degree model, and health degree models corresponding to microservices of different services are the same; determining, by the management device, a configuration parameter for the microservice of the service based on the health degree score when the health degree score of the microservice of the service is less than a preset score threshold; and configuring, by the management device, the microservice of the service based on the configuration parameter.

In the microservice configuration method provided in this embodiment of the present disclosure, the management device obtains each indicator of the microservice of the service, where types of all indicators of microservices of different services are the same; calculates the health degree score of the microservice of the service based on each indicator of the microservice of the service, the indicator weight information, and the health degree model, where health degree models corresponding to microservices of different services are the same; determines the configuration parameter for the microservice of the service based on the health degree score when the health degree score of the microservice of the service is less than the preset score threshold; and configures the microservice of the service based on the configuration parameter. An operation and maintenance engineer does not need to identify an indicator that greatly affects service performance of each microservice, and determine and select a configuration parameter based on the identified indicator, so that efficiency and accuracy of service configuration are improved. In addition, microservices of different services are differentiated by using different pieces of indicator weight information, and there is no need to set an independent health degree model for a microservice of each service. To be specific, a difference between the microservices is shielded by using a uniform health degree model, thereby reducing complexity of a system, so that the system is simpler, more practical, and more efficient.

In a possible implementation, the configuring, by the management device, the microservice based on the configuration parameter includes: performing, by the management device, at least one of the following configurations: traffic flow control, service degradation, timeout control, priority scheduling, traffic offset, or flexible scaling on the microservice of the service based on the configuration parameter.

A specific configuration manner for the microservice is provided in this solution.

In a possible implementation, before the calculating, by the management device, a health degree score of the microservice of the service based on each indicator of the microservice of the service and indicator weight information and a health degree model that are corresponding to the microservice of the service, the method further includes: querying, by the management device, the indicator weight information based on identifier information of the microservice of the service and a correspondence between the identifier information and the indicator weight information.

In a possible implementation, the obtaining, by a management device, each indicator of a microservice of a service includes: obtaining, by the management device, each indicator of the microservice of the service in a previous unit time period; and the configuring, by the management device, the microservice of the service based on the configuration parameter includes: configuring, by the management device, the microservice of the service in a next unit time period based on the configuration parameter.

In a possible implementation, the microservice of the service includes at least two microservices, and the configuring, by the management device, the microservice of the service based on the configuration parameter includes: for the at least two microservices included in the microservice of the service, successively sending, by the management device, configuration requests to host devices respectively corresponding to the at least two microservices, where the configuration request includes a configuration parameter of a corresponding microservice, and the configuration request is used to instruct a corresponding host device to configure, based on the configuration parameter of the microservice corresponding to the configuration request, the microservice corresponding to the configuration request; setting, by the management device, listeners respectively corresponding to the at least two microservices, where the listener is configured to listen to a configuration result returned by a corresponding host device; and when all the listeners respectively corresponding to the at least two microservices receive configuration results respectively corresponding to the at least two microservices, determining, by the management device, that configuration for the at least two microservices is completed.

This solution is a solution of performing parallel configuration on all microservices. When a plurality of microservices need to be configured, configuration requests may be successively sent to host devices corresponding to all the microservices, to instruct each host device to configure a microservice run by the host device, and a configuration result of each microservice is determined by using a listener corresponding to each microservice. Configuration for a current microservice can be performed without a need of waiting for successful configuration for a previous microservice, so that microservice configuration efficiency, concurrency, and time validity are improved, and a delay is reduced.

In a possible implementation, all the indicators of the microservice in the previous unit time period include at least one of the following indicators: unavailable duration, available duration, a throughput used during a normal service, a total quantity of calls occurred during a normal service, a quantity of calls during which fault-tolerance degradation occurs, a quantity of calls during which forced degradation occurs, a total quantity of calls during which service degradation occurs, a total quantity of calls occurred during parallel control, a quantity of discarded calls occurred during parallel control, a total quantity of calls occurred during traffic flow control, a quantity of discarded calls occurred during traffic flow control, a total quantity of calls occurred during an abnormal service, a ratio of a quantity of calls with a call delay greater than a delay threshold, a quantity of call failures, a quantity of routing failures, a quantity of call timeout times, or a quantity of other call faults.

In a possible implementation, the calculating, by the management device, a health degree score of the microservice based on each indicator of the microservice and indicator weight information and a health degree model that are corresponding to the microservice includes:

calculating, by the management device, the health degree score of the microservice of the service in the previous unit time period according to the following formula:

Health degree score=100×(((K1×Microservice availability score)+(K2×Microservice subhealth score))/(K1+K2))−Event-based deduction score, where Microservice availability score=(Available duration/Duration of a unit time period)×(Quantity of processed calls/Total quantity of calls), and Quantity of processed calls/Total quantity of calls=(((K3×((Total quantity of calls during which service degradation occurs−α×Quantity of calls during which fault-tolerance degradation occurs−β×Quantity of calls during which forced degradation occurs)/Total quantity of calls during which service degradation occurs)+K4×((Total quantity of calls occurred during parallel control−Quantity of discarded calls occurred during parallel control)/Total quantity of calls occurred during parallel control)+K5×((Total quantity of calls occurred during traffic flow control−Quantity of discarded calls occurred during traffic flow control)/Total quantity of calls occurred during traffic flow control)))/(K3+K4+K5))×Total quantity of calls occurred during an abnormal service+Total quantity of calls occurred during a normal service);

Microservice subhealth score=Ratio of a quantity of calls with a call delay greater than a delay threshold;

Event-based deduction score=Quantity of events including a call failure, a routing failure, call timeout, and another call fault whose quantities of occurrences exceed preset time thresholds in the unit time period×Predetermined value V; and K1 is a weight corresponding to the microservice availability score, K2 is a weight corresponding to the microservice subhealth score, K3 is a weight corresponding to a service degradation event, α is a weight corresponding to the quantity of calls during which fault-tolerance degradation occurs, β is a weight corresponding to the quantity of calls during which forced degradation occurs, K4 is a weight corresponding to a parallel control event, and K5 is a weight corresponding to a traffic flow control event.

A specific health degree score calculation method is provided in this solution.

In a possible implementation, the determining, by the management device, a configuration parameter for the microservice of the service based on the health degree score when the health degree score of the microservice of the service is less than a preset score threshold includes: when the health degree score of the microservice of the service is less than the preset score threshold, determining, by the management device from a configuration parameter database based on the health degree score, the configuration parameter that is adapted to the health degree score and that is corresponding to the microservice of the service.

In a possible implementation, the method further includes: performing, by the management device in a specified time period, offline automatic drilling based on each indicator of the microservice of the service in a predetermined duration range existing before the specified time period starts, so as to obtain a configuration parameter that is of the microservice of the service and that is corresponding to each health degree score; and updating the configuration parameter database based on the obtained configuration parameter.

In this solution, a method for updating a configuration parameter database by performing offline drilling by using actually collected data is provided, so as to modify a correspondence between a configuration parameter and a health degree score in time based on an actual running status, thereby improving microservice configuration accuracy.

According to a second aspect, an embodiment of the present disclosure provides a management device. The management device includes a processor and a memory, the processor is configured to execute a program instruction stored in the memory, and the processor implements, by executing the instruction, the microservice configuration method provided in the first aspect or various possible implementations of the first aspect.

According to a third aspect, an embodiment of the present disclosure provides a microservice configuration apparatus. The microservice configuration apparatus includes at least one unit, and the at least one unit is configured to implement the microservice configuration method provided in the first aspect or various possible implementations of the first aspect.

According to a fourth aspect, an embodiment of the present disclosure further provides a computer-readable medium, and the computer-readable medium stores an instruction used to implement the microservice configuration method provided in the first aspect or various possible implementations of the first aspect.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the implementations of the present disclosure in detail with reference to the accompanying drawings.

It should be understood that "several" mentioned in this specification means one or more, and "a plurality of" means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
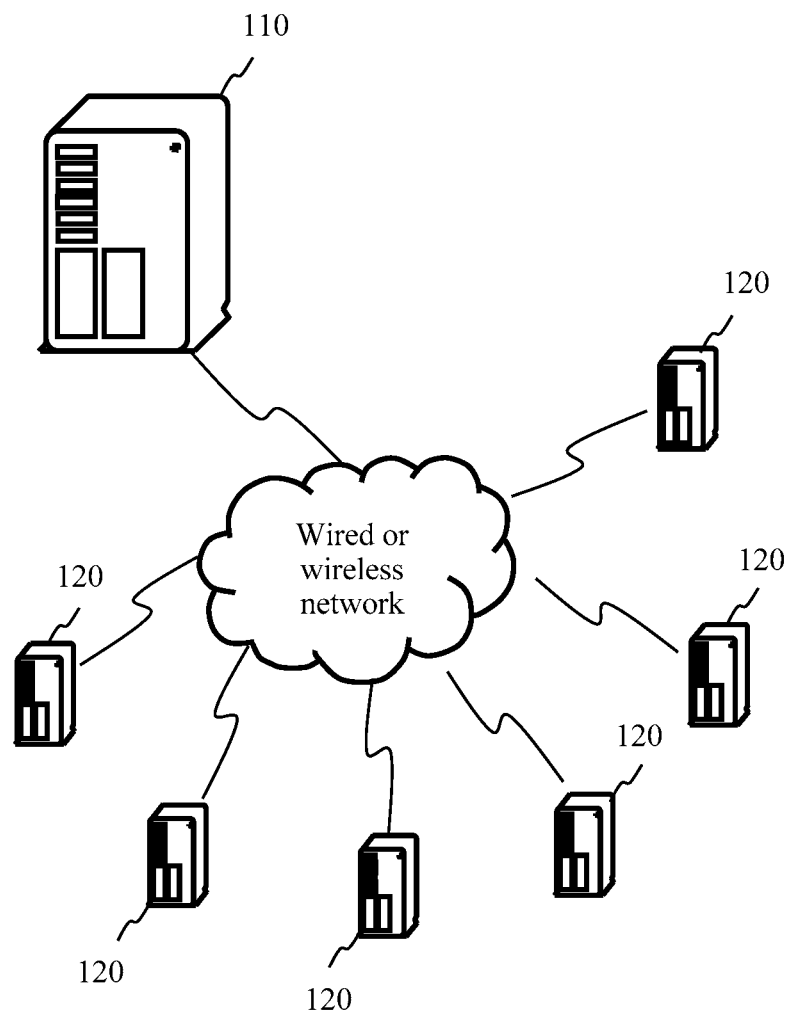
FIG. 1 is an architectural diagram of a network environment in the present disclosure.

FIG. 1 is an architectural diagram of a network environment in the present disclosure. The network environment includes the following network devices: a management device 110 and several host devices 120.

The management device 110 may be a single server, or may be a service cluster including a plurality of servers, or may be a cloud computing center.

The host devices 120 may be physical hosts, or may be virtual hosts.

The management device 110 is connected to the host devices 120 by using a wired or wireless network.

In this disclosed embodiment, the management device 110 and the several host devices 120 constitute a service system, the service system externally provides several microservices of different services, and each microservice is run by one or more host devices 120. The host devices 120 may collect indicators for microservices run by the host devices, and send the collected indicators to the management device 110. The management device 110 monitors health degrees of the microservices based on the collected indicators of the microservices of various services, determines a configuration parameter for a microservice that needs to be configured, and delivers the determined configuration parameter to a corresponding host device 120. The host device 120 configures the corresponding microservice.

Figure 2:
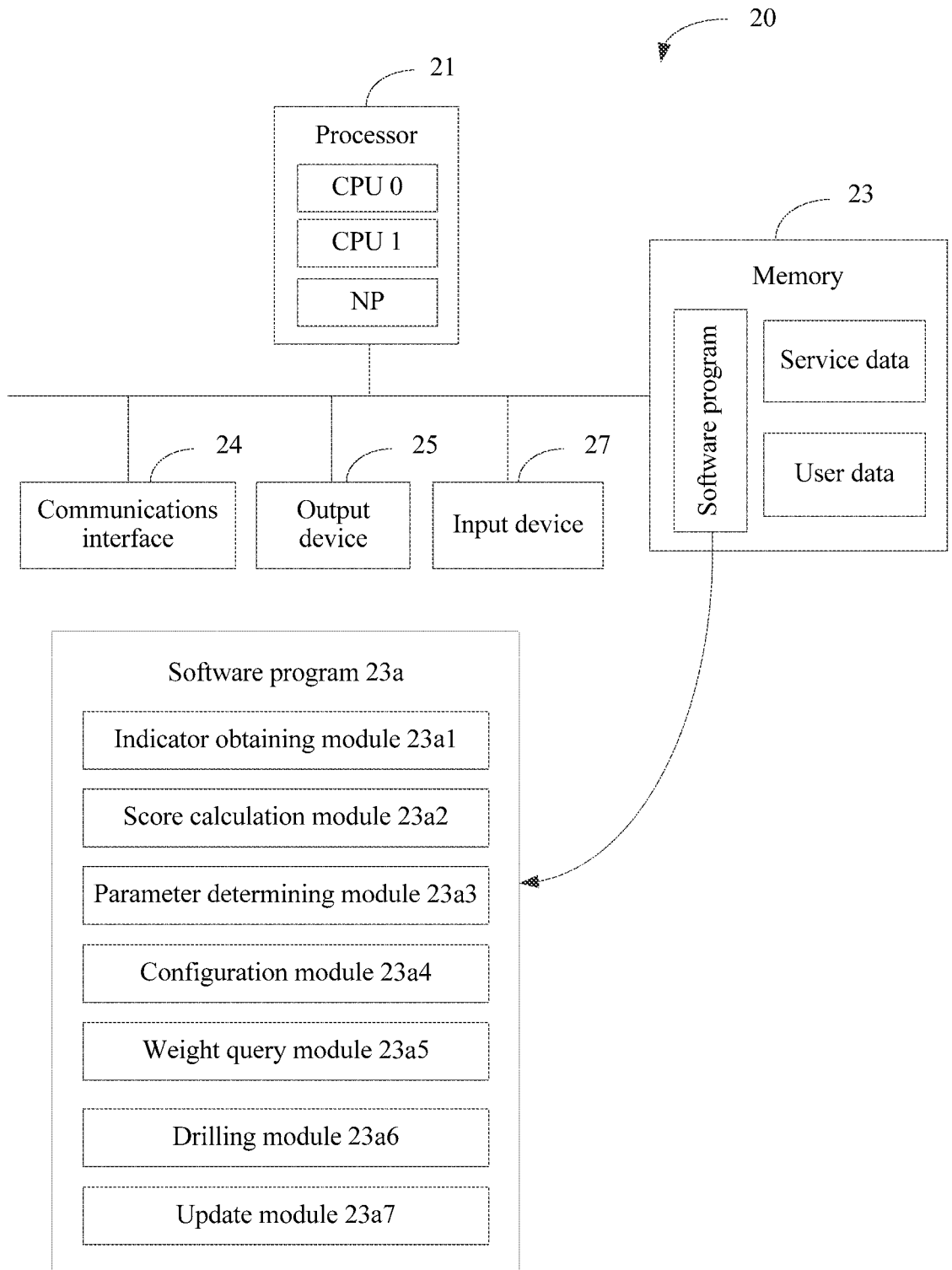
FIG. 2 is a schematic structural diagram of a management device according to an example embodiment of the present disclosure.

FIG. 2 is a schematic structural diagram of a management device 20 according to an embodiment of the present disclosure. The management device 20 may be implemented as the management device 110 in the network environment shown in FIG. 1. As shown in FIG. 2, the management device 20 may include a processor 21 and a communications interface 24.

The processor 21 may include one or more processing units, and the processing unit may be a central processing unit (CPU), a network processor (NP), or the like.

The communications interface 24 may include a wired network interface, such as an Ethernet interface or a fiber interface, or may include a wireless network interface, such as a wireless local area network interface or a cellular mobile network interface. The management device 20 communicates with each host device by using the communications interface 24.

Optionally, the management device 20 may further include a memory 23, and the processor 21 may be connected to the memory 23 and the communications interface 24 by using a bus.

The memory 23 may be configured to store a software program 23a, and the software program 23a may be executed by the processor 21. In addition, the memory 23 may further store different types of service data or user data.

Optionally, as shown in FIG. 2, the software program 23a may include an indicator obtaining module 23a1, a score calculation module 23a2, a parameter determining module 23a3, a configuration module 23a4, a weight query module 23a5, a drilling module 23a6, and an update module 23a7.

The indicator obtaining module 23a1 is configured to obtain each indicator of a microservice of a service, and types of all indicators of microservices of different services are the same.

The score calculation module 23a2 is configured to calculate a health degree score of the microservice of the service based on each indicator of the microservice of the service and indicator weight information and a health degree model that are corresponding to the microservice of the service. The indicator weight information indicates a weight of each indicator of the microservice of the service in the health degree model, and health degree models corresponding to microservices of different services are the same.

The parameter determining module 23a3 is configured to determine a configuration parameter for the microservice of the service based on the health degree score when the health degree score of the microservice of the service is less than a preset score threshold.

The configuration module 23a4 is configured to configure the microservice of the service based on the configuration parameter.

The weight query module 23a5 is configured to query the indicator weight information based on identifier information of the microservice of the service and a correspondence between the identifier information and the indicator weight information before the score calculation module 23a2 calculates the health degree score of the microservice of the service based on each indicator of the microservice of the service and the indicator weight information and the health degree model that are corresponding to the microservice.

The drilling module 23a6 is configured to perform, in a specified time period, offline automatic drilling based on each indicator of the microservice of the service in a predetermined duration range existing before the specified time period starts, so as to obtain a configuration parameter that is of the microservice of the service and that is corresponding to each health degree score.

The update module 23a7 is configured to update a configuration parameter database based on the obtained configuration parameter.

Optionally, the management device 20 may further include an output device 25 and an input device 27. The output device 25 and the input device 27 are connected to the processor 21. The output device 25 may be a display for displaying information, a power amplification device for playing sound, a printer, or the like. The output device 25 may further include an output controller, to provide output for the display, the power amplification device, or the printer. The input device 27 may be a device such as a mouse, a keyboard, an electronic stylus, or a touch panel used by a user to enter information. The input device 27 may further include an input controller, to receive and process input from the device such as the mouse, the keyboard, the electronic stylus, or the touch panel.

Figure 3:
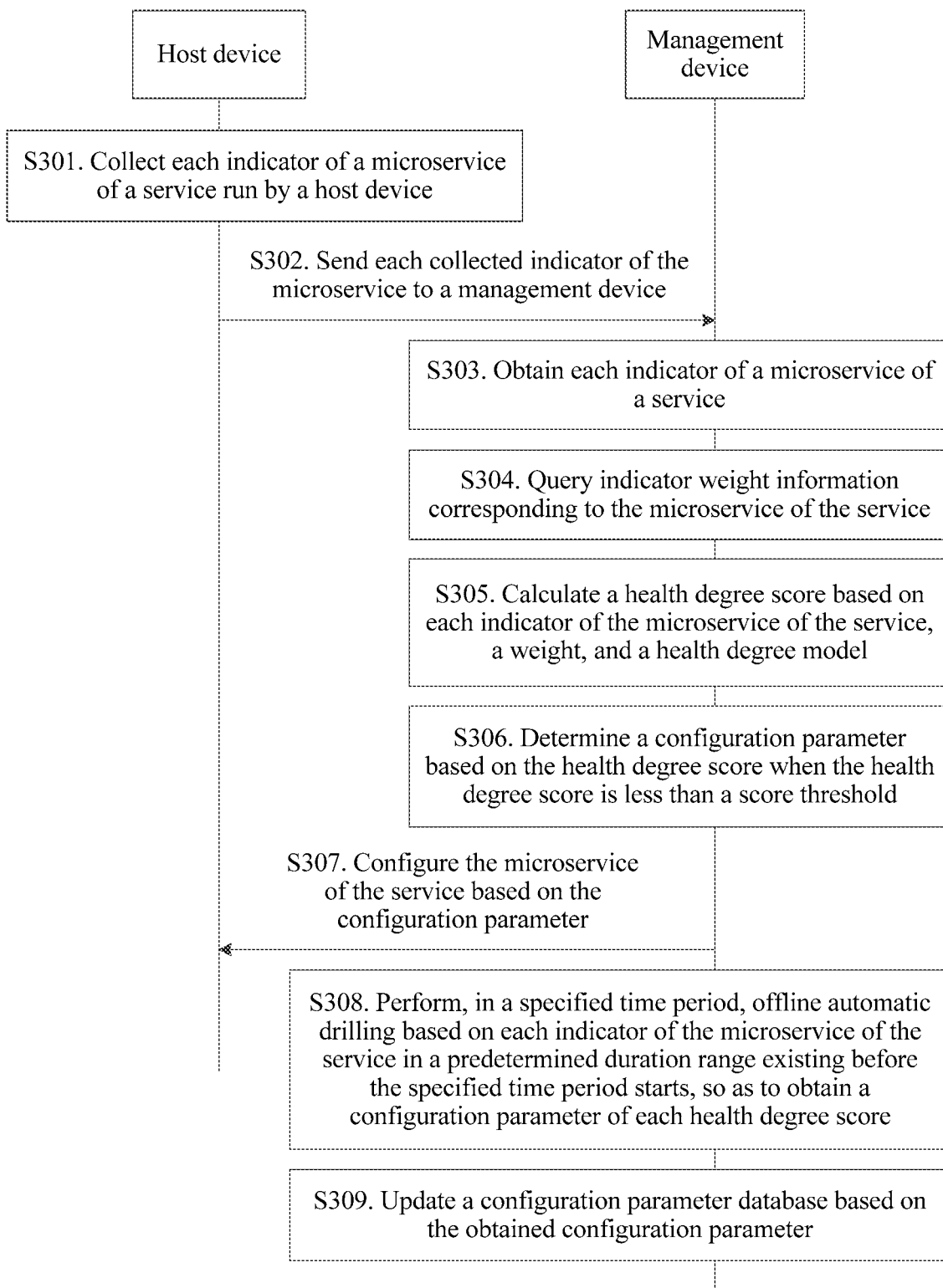
FIG. 3 is a flowchart of a microservice configuration method according to an embodiment of the present disclosure.

Referring to FIG. 3, FIG. 3 is a flowchart of a microservice configuration method according to an embodiment of the present disclosure. The method may be applied to the management device 110 in the network environment shown in FIG. 1. As shown in FIG. 3, the microservice configuration method may include the following steps.

Step 301: Each host device collects each indicator of a microservice of a service run by the host device.

Each indicator is used to indicate service performance of a corresponding microservice. A plurality of different services may run on each host device. Each service may be corresponding to one or more microservices. In this embodiment of the present disclosure, when the indicator of the microservice is collected, all indicators of microservices of different services are the same.

For example, it is assumed that there are three different services: a service A, a service B, and a service C in a system, microservices corresponding to all the services are different from each other, the service A is corresponding to a microservice a, the service B is corresponding to a microservice b, and the service C is corresponding to a microservice c. When each host device in the system collects indicators for the foregoing three microservices, the services to which the microservices belong are not differentiated, and for all the microservices, types of the collected indicators are the same.

In this embodiment of the present disclosure, an indicator collection module may be disposed in the host device, and the indicator collection module is configured to: collect, in real time, various indicators of a microservice running on the current host device, and send the various collected indicators of the microservice to a communication queue to wait for being sent.

Specifically, to ensure high efficiency of microservice configuration, the indicator collection module incrementally collects the various indicators of the microservice of the service in real time.

In this embodiment of the present disclosure, the various indicators of the microservice are collected in two manners: disk collection and flow collection. The disk collection means that the host device first writes the various indicators into a log, and the indicator collection module listens to the log and reads, from a disk, data corresponding to the various indicators of the microservice that are in the log. The flow collection means that the indicator collection module directly reads, from a memory, data corresponding to the various indicators of the microservice.

Step 302: Each host device sends each collected indicator of the microservice to a management device, and the management device receives each indicator that is sent by each host device and that is of the microservice.

To ensure time validity of transmission of microservice performance KPI data, in this embodiment of the present disclosure, the host device may send each collected indicator of the microservice by using asynchronous non-blocking communication, binary transmission, and a bitstream compression technology. Specifically, the indicator collection module in the host device may invoke an interface provided by the management device, and send collected indicators of the microservice to the management device in an asynchronous non-blocking communication manner, a binary transmission manner, and a bitstream compression manner.

Step 303: The management device obtains each indicator of a microservice of a service.

In this embodiment of the present disclosure, the management device may collect data that is sent by each host device and that is of an indicator of each microservice. In actual application, because versions of indicator collection modules in all host devices may be inconsistent, formats of the sent data may be inconsistent, either. In this case, the management device may further format the data that is sent by each host device and that is of the indicator of each microservice, so as to process the indicator subsequently in a uniform data format.

In this embodiment of the present disclosure, the management device may configure the microservice based on a specific period. When obtaining each indicator of the microservice of the service, the management device may obtain each indicator of the microservice of the service in a previous unit time period, and process each indicator in the previous unit time period in the subsequent steps.

Step 303 may be implemented by the processor 21 by executing the indicator obtaining module 23a1 in FIG. 2.

Step 304: The management device queries, based on identifier information of the microservice of the service and a correspondence between the identifier information and indicator weight information, the indicator weight information corresponding to the microservice of the service.

Indicator weight information of a microservice of each service may be set or updated by management personnel or a system.

Due to a service form difference, configuration parameters of microservices also have a relatively large difference. For example, an accounting microservice has an extremely high requirement on a microservice call success rate (such as 99.999%). When service configuration is performed on the accounting microservice, a parameter indicator of an accounting microservice call success rate needs to be focused on. A microservice of a forum type, such as a user review microservice, has a relatively high requirement on a concurrency count and a throughput, but a relatively low requirement on a success rate (for example, a user review function is disabled or service degradation is performed on a user review function during e-commerce promotion). During configuration of the user review microservice, parameter indicators including transactions per second (TPS) and a quantity of concurrent calls of the microservice are usually focused on. Therefore, in this embodiment of the present disclosure, the management personnel or the system may preset an indicator weight corresponding to a microservice of each service. Indicator weight information corresponding to microservices of different services may alternatively be different. When processing each indicator of a microservice of a service, the management device may first query indicator weight information corresponding to the microservice of the service, and perform subsequent processing based on the indicator weight information.

Step 304 may be implemented by the processor 21 in FIG. 2 by executing the weight query module 23a5.

Step 305: The management device calculates a health degree score of the microservice of the service based on each obtained indicator of the microservice of the service and the indicator weight information and a health degree model that are corresponding to the microservice of the service.

The indicator weight information is used to indicate a respective weight of each indicator of the corresponding microservice, and health degree models corresponding to microservices of different services are the same. In addition, indicator weight information corresponding to microservices of different services may be the same, or may be different.

In this embodiment of the present disclosure, microservices of all services in the system share one health degree model. In the health degree model, a health degree score corresponding to a microservice of a service can be calculated with reference to a specific indicator and a weight of the microservice of the service. Microservices of different services are differentiated by using different pieces of indicator weight information, and there is no need to set an independent health degree model for a microservice of each service. To be specific, a difference between the services is shielded by using a uniform health degree model, thereby reducing complexity of the system, so that the system is simpler, more practical, and more efficient.

For example, the management personnel or the system may perform differentiated evaluation on a health degree of the microservice of the service by dynamically adjusting the weight that affects the health degree score of the microservice. The accounting microservice and the user review microservice are used as an example. The accounting microservice focuses more on a success rate parameter indicator. The system may increase a weight of a call success rate of the accounting microservice, and then the success rate parameter indicator more greatly affects a health degree score of the accounting microservice. For the user review microservice, the system increases a weight of a throughput parameter indicator.

For a microservice on which differentiated configuration does not need to be performed, the system uses a default weight. For a microservice on which differentiated configuration needs to be performed, the system may preset a mapping relationship between a weight and a microservice in a database or a memory, perform matching in the database or the memory by using information such as a name or a version number of the microservice to obtain a differentiated weight, and calculate a health degree score of the microservice based on the obtained weight.

In this embodiment of the present disclosure, all indicators of the microservice of the service in the previous unit time period include at least one of the following indicators: unavailable duration, available duration, a throughput used during a normal service, a total quantity of calls occurred during a normal service, a quantity of calls during which fault-tolerance degradation occurs, a quantity of calls during which forced degradation occurs, a total quantity of calls during which service degradation occurs, a total quantity of calls occurred during parallel control, a quantity of discarded calls occurred during parallel control, a total quantity of calls occurred during traffic flow control, a quantity of discarded calls occurred during traffic flow control, a total quantity of calls occurred during an abnormal service, a ratio of a quantity of calls with a call delay greater than a delay threshold, a quantity of call failures, a quantity of routing failures, a quantity of call timeout times, or a quantity of other call faults.

The foregoing indicators are used as an example. In this embodiment of the present disclosure, the management device may calculate the health degree score of the microservice in the previous unit time period according to the following formula:

Health degree score=100×((($K1$×Microservice availability score)+($K2$×Microservice subhealth score))/($K1$+$K2$))−Event-based deduction score,
where Microservice availability score=(Available duration/Duration of a unit time period)×(Quantity of processed calls/Total quantity of calls), and Quantity of processed calls/Total quantity of calls=((($K3$×((Total quantity of calls during which service degradation occurs−$\alpha$×Quantity of calls during which fault-tolerance degradation occurs−$\beta$×Quantity of calls during which forced degradation occurs)/Total quantity of calls during which service degradation occurs)+$K4$×((Total quantity of calls occurred during parallel control−Quantity of discarded calls occurred during parallel control)/Total quantity of calls occurred during parallel control)+$K5$×((Total quantity of calls occurred during traffic flow control−Quantity of discarded calls occurred during traffic flow control)/Total quantity of calls occurred during traffic flow control)))/($K3$+$K4$+$K5$))×Total quantity of calls occurred during an abnormal service+Total quantity of calls occurred during a normal service);

Microservice subhealth score=Ratio of a quantity of calls with a call delay greater than a delay threshold;

Event-based deduction score=Quantity of events including a call failure, a routing failure, call timeout, and another call fault whose quantities of occurrences exceed preset time thresholds in the unit time period×Predetermined value V; and $K1$ is a weight corresponding to the microservice availability score, $K2$ is a weight corresponding to the microservice subhealth score, $K3$ is a weight corresponding to a service degradation event, α is a weight corresponding to the quantity of calls during which fault-tolerance degradation occurs, β is a weight corresponding to the quantity of calls during which forced degradation occurs, K4 is a weight corresponding to a parallel control event, and K5 is a weight corresponding to a traffic flow control event.

Step 305 may be implemented by the processor 21 by executing the score calculation module 23a2 in FIG. 2.

Step 306: The management device determines a configuration parameter for the microservice of the service based on the health degree score when the health degree score of the microservice of the service is less than a preset score threshold.

When the health degree score of the microservice is less than the preset score threshold, the management device determines, from a configuration parameter database based on the health degree score, the configuration parameter that is adapted to the health degree score and that is corresponding to the microservice of the service.

Specifically, in this embodiment of the present disclosure, after obtaining the health degree score of the microservice of the service through calculation, the management device compares the obtained health degree score with a preset health degree score, and determines whether the obtained health degree score reaches an expectation. If the obtained health degree score does not reach the expectation, the management device searches for an appropriate configuration parameter in a machine learning manner based on the obtained health degree score, the configuration parameter database, and a preset algorithm, and outputs the configuration parameter.

Step 306 may be implemented by the processor 21 by executing the parameter determining module 23a3 in FIG. 2.

Step 307: The management device configures the microservice of the service based on the configuration parameter.

In this embodiment of the present disclosure, when configuring the microservice of the service, the management device may perform at least one of the following configurations: traffic flow control, service degradation, timeout control, priority scheduling, traffic offset, or flexible scaling on the microservice of the service based on the configuration parameter.

The management device may configure the microservice of the service in a next unit time period based on the configuration parameter. Specifically, for at least two microservices included in the microservice of the service, the management device successively sends configuration requests to host devices respectively corresponding to the at least two microservices, where the configuration request includes a configuration parameter of a corresponding microservice, and the configuration request is used to instruct a corresponding host device to configure, based on the configuration parameter of the microservice corresponding to the configuration request, the microservice corresponding to the configuration request. The management device sets listeners respectively corresponding to the at least two microservices, where the listener is configured to listen to a configuration result returned by a corresponding host device. When all the listeners respectively corresponding to the at least two microservices receive configuration results respectively corresponding to the at least two microservices, the management device determines that configuration for the at least two microservices is completed.

To improve microservice configuration efficiency, concurrency, and time validity, and reduce a delay, when sending a configuration request of a microservice of a service, the management device may send the configuration request to a corresponding host device by invoking a service configuration interface corresponding to the microservice. Specifically, a batch parallel invocation technology is provided in the solutions shown in this embodiment of the present disclosure. A batch of services are called in a parallel and asynchronous manner by encapsulating a batch invocation interface and using a synchronous-to-asynchronous conversion technology, and an asynchronous-to-synchronous conversion technology, so that a service configuration interface invocation delay can be significantly reduced, thereby improving time validity of microservice configuration. Microservice configuration operations are independent of each other and are operations that do not depend on a logical context. Therefore, serial interface invoking in the microservice configuration operations may be optimized into parallel invoking. An example of code of an encapsulated batch service interface is as follows:

ParallelFuture future=ParallelFuture.invokeService{service1, service2 . . . serviceN}

Object [ ] results=future.get( )

One service call can implement a parallel configuration operation on microservices of a plurality of services by using the foregoing interface.

If a serial and synchronous service call is still used during simple interface encapsulation, a current thread is still blocked, and a parallel acceleration effect cannot be implemented. To resolve this problem, a serial and synchronous operation is converted into an asynchronous operation in this embodiment of the present disclosure. Specifically, asynchronous non-blocking I/O may be used for an interface service call, and an I/O read/write operation in a network does not block an invocation thread. After a service call is initiated, the thread does not need to be suspended to wait for a response, but an invocation context is stored in Future. A registration result notifies that a listener registers with the Future. Once a service provider returns a response, a system context is obtained based on a message ID, and the listener in the Future is called back, to obtain a result and notify the listener.

A Java language is used as an example. This embodiment of the present disclosure provides a key procedure of conversion from batch synchronization to asynchronization and conversion from asynchronization to synchronization after aggregation. The procedure is implemented as follows:

1. A parallel service call is initiated by using a batch service call interface.

2. ParallelInvoker is responsible for constructing a ParallelFuture object, and ParallelFuture stores service call context information, used to asynchronously receive a result.

3. A CommonInvoker interface is invoked cyclically and serially because the CommonInvoker interface supports asynchronous non-blocking I/O invoking, and does not block an invocation thread.

4. A ParallelFuture object is immediately returned without a need of synchronously waiting for a service call result.

5. Future of each service call has a ParallelFuture pointer reference. When onReceiveResponse of SourceHandler in a service is triggered, it indicates that a result of the service call is already returned. In this method, a ParallelFuture result is updated based on index information. After all service call results are successfully set in ParallelFuture, batch service invoking is completed.

6. A get(timeout) interface is invoked to actively wait for returning of a response for batch invocations.

7. If all service call results are already aggregated to ParallelFuture, the get(timeout) interface returns an object array including all the service call results.

In the foregoing method, total time consumed in microservice configuration may be compressed into maximum time consumed in configuration of a single microservice, but is not a sum of time consumed in configuration of all microservices in a conventional sense.

Step 307 may be implemented by the processor 21 by executing the configuration module 23a4 in FIG. 2.

The previous unit time period may be a time period whose time length is one unit time length and that is before a time point at which the management device obtains each indicator of the microservice of the service. The time point at which the management device obtains each indicator of the microservice of the service may be an end time point of the previous unit time period, or may be after an end time point of the previous unit time period. Correspondingly, the next unit time period may be a time period whose time length is one unit time length and that is after the time point at which the management device obtains each indicator of the microservice of the service. The time point at which the management device obtains each indicator of the microservice of the service may be a start time point of the next unit time period, or may be before a start time point of the next unit time period.

Specifically, that the management device configures the microservice of the service based on a period of one hour is used as an example. The management device uses each hour as a unit time period. If the previous unit time period is (5:00:00, 6:00:00), the next unit time period is (6:00:00, 7:00:00). The management device starts to perform step 303 to step 307 at the time point 6:00:00 to determine a configuration parameter of the microservice of the service in the time period from 6:00:00 to 7:00:00 by using each indicator of the microservice of the service in the time period from 5:00:00 to 6:00:00, and configure the microservice of the service.

Alternatively, that the management device configures the microservice of the service based on a period of one hour is used as an example. The management device uses last 59 minutes of each hour as a unit time period. If the previous unit time period is (5:01:00, 6:00:00), the next unit time period is (6:01:00, 7:00:00). The management device performs step 303 to step 306 in a time period from 6:00:00 to 06:01:00 to determine a configuration parameter of the microservice of the service in the time period from 6:01:00 to 7:00:00 by using each indicator of the microservice of the service in the time period from 5:01:00 to 6:00:00, and starts to perform step 307 at the time point 6:01:00 to configure the microservice of the service.

Step 308: The management device performs, in a specified time period, offline automatic drilling based on each indicator of the microservice of the service in a predetermined duration range existing before the specified time period starts, so as to obtain a configuration parameter that is of the microservice of the service and that is corresponding to each health degree score.

Step 308 may be implemented by the processor 21 by executing the drilling module 23a6 in FIG. 2.

Step 309: The management device updates a configuration parameter database based on the obtained configuration parameter.

Step 309 may be implemented by the processor 21 by executing the update module 23a7 in FIG. 2.

In this embodiment of the present disclosure, when the management device is idle (for example, early in the morning), the management device may perform offline automatic drilling based on different types of collected original data and data flows to search for an optimal configuration parameter, and update the optimal configuration parameter to the configuration parameter database.

In conclusion, in the microservice configuration method provided in this embodiment of the present disclosure, the management device obtains each indicator of the microservice of the service, where types of all indicators of microservices of different services are the same; calculates the health degree score of the microservice of the service based on each indicator of the microservice of the service, the indicator weight information, and the health degree model, where health degree models corresponding to microservices of different services are the same; determines the configuration parameter for the microservice of the service based on the health degree score when the health degree score of the microservice of the service is less than the preset score threshold; and configures the microservice of the service based on the configuration parameter. An operation and maintenance engineer does not need to identify an indicator that greatly affects service performance of each microservice, and determine and select a configuration parameter based on the identified indicator, so that efficiency and accuracy of service configuration are improved. In addition, microservices of different services are differentiated by using different pieces of indicator weight information, and there is no need to set an independent health degree model for a microservice of each service. To be specific, a difference between the microservices is shielded by using a uniform health degree model, thereby reducing complexity of the system, so that the system is simpler, more practical, and more efficient.

Figure 4:
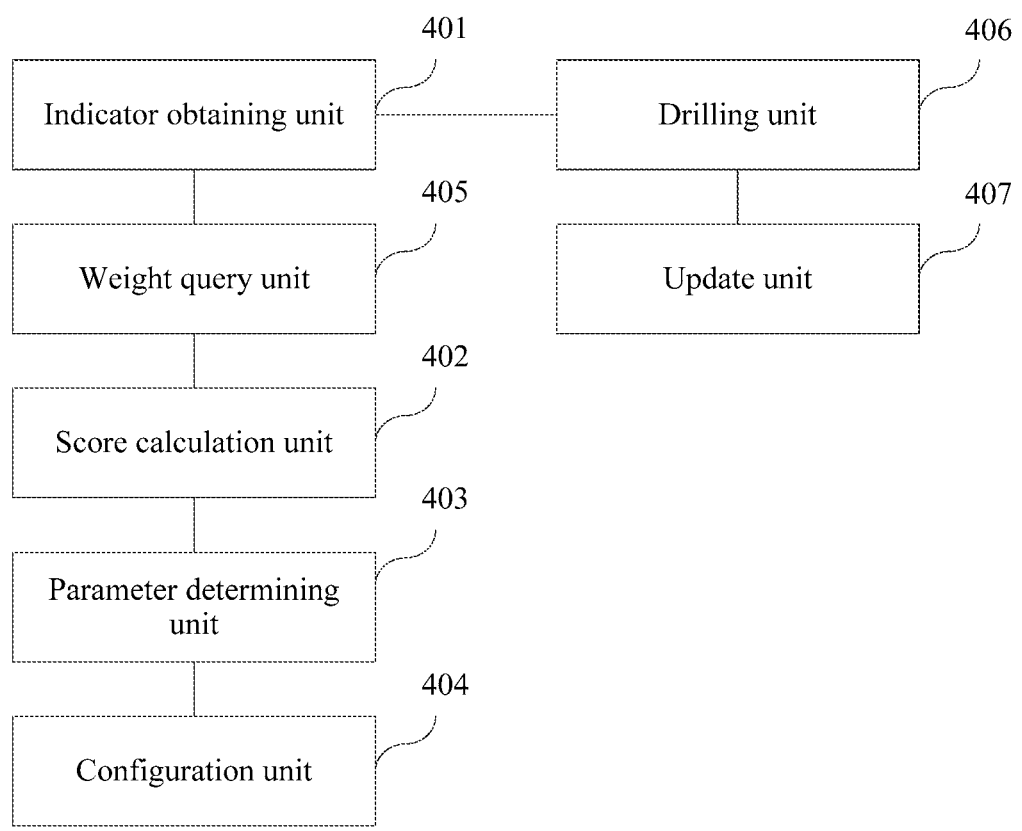
FIG. 4 is a block diagram of a microservice configuration apparatus according to an embodiment of the present disclosure.

Referring to FIG. 4, FIG. 4 is a block diagram of a microservice configuration apparatus according to an embodiment of the present disclosure. The apparatus may be implemented, by using hardware or a combination of hardware and software, as a part or an entirety of the management device 110 in the network environment shown in FIG. 1, so as to perform all or some of the steps performed by the management device in FIG. 3. The apparatus may include an indicator obtaining module 401, a score calculation module 402, a parameter determining module 403, a configuration module 404, a weight query module 405, a drilling module 406, and an update module 407.

In this embodiment, the apparatus is presented in a form of a functional unit. The "unit" herein may be an application-specific integrated circuit (ASIC), a circuit, a processor and a memory that execute one or more software or firmware programs, an integrated logic circuit, and/or another device that can provide the foregoing functions.

The indicator obtaining unit 401 has a function the same as or similar to that of the indicator obtaining module 23a1.

The score calculation unit 402 has a function the same as or similar to that of the score calculation module 23a2.

The parameter determining unit 403 has a function the same as or similar to that of the parameter determining module 23a3.

The configuration unit 404 has a function the same as or similar to that of the configuration module 23a4.

The weight query unit 405 has a function the same as or similar to that of the weight query module 23a5.

The drilling unit 406 has a function the same as or similar to that of the drilling module 23a6.

The update unit 407 has a function the same as or similar to that of the update module 23a7.

A person of ordinary skill in the art may understand that all or some of the steps of the embodiments may be implemented by hardware or a program instructing relevant hardware. The program may be stored in a computer-readable storage medium. The storage medium may include: a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A microservice configuration apparatus, wherein the apparatus comprises:
    a memory configured to store instructions; and
    at least one processor coupled to the memory, wherein the instructions, when executed by the at least one processor, cause the apparatus to:
        obtain each indicator of a microservice of a service in a previous time period, wherein types of all indicators of microservices of different services are the same;
        calculate a health degree score of the microservice of the service in the previous time period based on each indicator of the microservice of the service, and indicator weight information and a health degree model that correspond to the microservice of the service, wherein the indicator weight information indicates a weight of each indicator of the microservice of the service in the health degree model, wherein health degree models corresponding to microservices of different services are the same, and wherein the health degree score of the microservice of the service in the previous time period is calculated according to the following formula:

Health degree score=100×(((K1×Microservice availability score)+(K2×Microservice subhealth score))/(K1+K2))−Event-based deduction score, wherein:
            Microservice availability score=(Available duration/Duration of a unit time period)×(Quantity of processed calls/Total quantity of calls), and Quantity of processed calls/Total quantity of calls=(((K3×((Total quantity of calls during which service degradation occurs−α×Quantity of calls during which fault-tolerance degradation occurs−β×Quantity of calls during which forced degradation occurs)/Total quantity of calls during which service degradation occurs)+K4×((Total quantity of calls occurred during parallel control−Quantity of discarded calls occurred during parallel control)/Total quantity of calls occurred during parallel control)+K5×((Total quantity of calls occurred during traffic flow control−Quantity of discarded calls occurred during traffic flow control)/Total quantity of calls occurred during traffic flow control)))/(K3+K4+K5))×Total quantity of calls occurred during an abnormal service+Total quantity of calls occurred during a normal service);
            Microservice subhealth score=Ratio of a quantity of calls with a call delay greater than a delay threshold;
            Event-based deduction score=Quantity of events comprising a call failure, a routing failure, call timeout, and another call fault whose quantities of occurrences exceed preset time thresholds in the unit time period×Predetermined value V; and
            K1 is a weight corresponding to the microservice availability score, K2 is a weight corresponding to the microservice subhealth score, K3 is a weight corresponding to a service degradation event, α is a weight corresponding to the quantity of calls during which fault-tolerance degradation occurs, β is a weight corresponding to the quantity of calls during which forced degradation occurs, K4 is a weight corresponding to a parallel control event, and K5 is a weight corresponding to a traffic flow control event;
        determine a configuration parameter for the microservice of the service based on the health degree score when the health degree score of the microservice of the service is less than a preset score threshold; and
        configure the microservice of the service in a next time period based on the configuration parameter.

2. The apparatus according to claim 1, wherein the instructions, when executed by the at least one processor, further cause the apparatus to perform at least one of the following configurations:
    traffic flow control, service degradation, timeout control, priority scheduling, traffic offset, or flexible scaling on the microservice of the service based on the configuration parameter.

3. The apparatus according to claim 1, wherein the instructions, when executed by the at least one processor, further cause the apparatus to:
    query the indicator weight information based on identifier information of the microservice of the service and a correspondence between the identifier information and the indicator weight information before calculating the health degree score of the microservice of the service based on each indicator of the microservice of the service, and the indicator weight information and the health degree model that correspond to the microservice of the service.

4. The apparatus according to claim 1, wherein the microservice of the service comprises at least two microservices, and wherein the instructions, when executed by the at least one processor, further cause the apparatus to:
    for the at least two microservices comprised in the microservice of the service, successively send configuration requests to host devices respectively corresponding to the at least two microservices, wherein each configuration request comprises a configuration parameter of a corresponding microservice, and wherein each configuration request is used to instruct a corresponding host device to configure, based on the configuration parameter of the microservice corresponding to the particular configuration request, the microservice corresponding to the particular configuration request;
    set listeners respectively corresponding to the at least two microservices, wherein each listener is configured to listen to a configuration result returned by a corresponding host device; and
    when all the listeners respectively corresponding to the at least two microservices receive configuration results respectively corresponding to the at least two microservices, determine that configuration for the at least two microservices is completed.

5. The apparatus according to claim 1, wherein the instructions, when executed by the at least one processor, further cause the apparatus to:

when the health degree score of the microservice of the service is less than the preset score threshold, determine, from a configuration parameter database and based on the health degree score, the configuration parameter that is adapted to the health degree score and that corresponds to the microservice of the service.

6. The apparatus according to claim 5, wherein the instructions, when executed by the at least one processor, further cause the apparatus to:
perform, in a specified time period, offline automatic drilling based on each indicator of the microservice of the service in a predetermined duration range existing before the specified time period starts to obtain a configuration parameter that is of the microservice of the service and that corresponds to each health degree score; and
update the configuration parameter database based on the obtained configuration parameter.

7. A microservice configuration method, wherein the method comprises:
obtaining, by a management device, each indicator of a microservice of a service in a previous time period, wherein types of all indicators of microservices of different services are the same;
calculating, by the management device, a health degree score of the microservice of the service in the previous time period based on each indicator of the microservice of the service, and indicator weight information and a health degree model that correspond to the microservice of the service, wherein the indicator weight information indicates a weight of each indicator of the microservice of the service in the health degree model, wherein health degree models corresponding to microservices of different services are the same, and wherein the health degree score of the microservice of the service in the previous time period is calculated according to the following formula:

Health degree score=$100 \times (((K1 \times \text{Microservice availability score})+(K2 \times \text{Microservice subhealth score}))/(K1+K2))$−Event-based deduction score, wherein:

Microservice availability score=(Available duration/Duration of a unit time period)×(Quantity of processed calls/Total quantity of calls), and Quantity of processed calls/Total quantity of calls=$(((K3 \times ((\text{Total quantity of calls during which service degradation occurs}-\alpha \times \text{Quantity of calls during which fault-tolerance degradation occurs}-\beta \times \text{Quantity of calls during which forced degradation occurs})/\text{Total quantity of calls during which service degradation occurs})+K4 \times ((\text{Total quantity of calls occurred during parallel control}-\text{Quantity of discarded calls occurred during parallel control})/\text{Total quantity of calls occurred during parallel control})+K5 \times ((\text{Total quantity of calls occurred during traffic flow control}-\text{Quantity of discarded calls occurred during traffic flow control})/\text{Total quantity of calls occurred during traffic flow control}))/(K3+K4+K5)) \times \text{Total quantity of calls occurred during an abnormal service}+\text{Total quantity of calls occurred during a normal service})$;
Microservice subhealth score=Ratio of a quantity of calls with a call delay greater than a delay threshold;
Event-based deduction score=Quantity of events comprising a call failure, a routing failure, call timeout, and another call fault whose quantities of occurrences exceed preset time thresholds in the unit time period×Predetermined value V; and K1 is a weight corresponding to the microservice availability score, K2 is a weight corresponding to the microservice subhealth score, K3 is a weight corresponding to a service degradation event, $\alpha$ is a weight corresponding to the quantity of calls during which fault-tolerance degradation occurs, $\beta$ is a weight corresponding to the quantity of calls during which forced degradation occurs, K4 is a weight corresponding to a parallel control event, and K5 is a weight corresponding to a traffic flow control event;
determining, by the management device, a configuration parameter for the microservice of the service based on the health degree score when the health degree score of the microservice of the service is less than a preset score threshold; and
configuring, by the management device, the microservice of the service in a next time period based on the configuration parameter.

8. The method according to claim 7, wherein the configuring, by the management device, the microservice based on the configuration parameter comprises:
performing, by the management device, at least one of the following configurations:
traffic flow control, service degradation, timeout control, priority scheduling, traffic offset, or flexible scaling on the microservice of the service based on the configuration parameter.

9. The method according to claim 7, wherein before the calculating, by the management device, a health degree score of the microservice of the service based on each indicator of the microservice of the service, and indicator weight information and a health degree model that correspond to the microservice of the service, the method further comprises:
querying, by the management device, the indicator weight information based on identifier information of the microservice of the service and a correspondence between the identifier information and the indicator weight information.

10. The method according to claim 7, wherein the configuring, by the management device, the microservice of the service based on the configuration parameter comprises:
for at least two microservices comprised in the microservice of the service, successively sending, by the management device, configuration requests to host devices respectively corresponding to the at least two microservices, wherein each configuration request comprises a configuration parameter of a corresponding microservice, and wherein each configuration request is used to instruct a corresponding host device to configure, based on the configuration parameter of the microservice corresponding to the particular configuration request, the microservice corresponding to the particular configuration request;
setting, by the management device, listeners respectively corresponding to the at least two microservices, wherein each listener is configured to listen to a configuration result returned by a corresponding host device; and
when all the listeners respectively corresponding to the at least two microservices receive configuration results respectively corresponding to the at least two microservices, determining, by the management device, that configuration for the at least two microservices is completed.

11. The method according to claim 7, wherein all the indicators of the microservice in the previous time period comprise at least one of the following indicators:

unavailable duration, available duration, a throughput used during a normal service, a total quantity of calls occurred during a normal service, a quantity of calls during which fault-tolerance degradation occurs, a quantity of calls during which forced degradation occurs, a total quantity of calls during which service degradation occurs, a total quantity of calls occurred during parallel control, a quantity of discarded calls occurred during parallel control, a total quantity of calls occurred during traffic flow control, a quantity of discarded calls occurred during traffic flow control, a total quantity of calls occurred during an abnormal service, a ratio of a quantity of calls with a call delay greater than a delay threshold, a quantity of call failures, a quantity of routing failures, a quantity of call timeout times, or a quantity of other call faults.

12. The method according to claim 7, wherein the determining, by the management device, a configuration parameter for the microservice of the service based on the health degree score when the health degree score of the microservice of the service is less than a preset score threshold comprises:

when the health degree score of the microservice of the service is less than the preset score threshold, determining, by the management device from a configuration parameter database and based on the health degree score, the configuration parameter that is adapted to the health degree score and that corresponds to the microservice of the service.

13. The method according to claim 12, wherein the method further comprises:

performing, by the management device and in a specified time period, offline automatic drilling based on each indicator of the microservice of the service in a predetermined duration range existing before the specified time period starts to obtain a configuration parameter that is of the microservice of the service and that corresponds to each health degree score; and updating the configuration parameter database based on the obtained configuration parameter.

* * * * *